(12) United States Patent
Xia et al.

(10) Patent No.: US 11,989,209 B2
(45) Date of Patent: May 21, 2024

(54) ELECTRONIC DEVICE, AND COMPUTER-READABLE STORAGE MEDIUM

(71) Applicant: BOE TECHNOLOGY GROUP CO., LTD., Beijing (CN)

(72) Inventors: Youxiang Xia, Beijing (CN); Ken Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 17/789,895

(22) PCT Filed: Aug. 19, 2021

(86) PCT No.: PCT/CN2021/113475
§ 371 (c)(1),
(2) Date: Jun. 29, 2022

(87) PCT Pub. No.: WO2022/068456
PCT Pub. Date: Apr. 7, 2022

(65) Prior Publication Data
US 2023/0054354 A1    Feb. 23, 2023

(30) Foreign Application Priority Data
Sep. 30, 2020  (CN) .......................... 202011062927.X

(51) Int. Cl.
*G06F 7/00* (2006.01)
*G06F 16/242* (2019.01)
*G06F 16/28* (2019.01)

(52) U.S. Cl.
CPC .......... *G06F 16/285* (2019.01); *G06F 16/244* (2019.01); *G06F 16/288* (2019.01)

(58) Field of Classification Search
CPC ..... G06F 16/285; G06F 16/244; G06F 16/288
(Continued)

(56) References Cited

U.S. PATENT DOCUMENTS

2016/0034827 A1* 2/2016 Morris ................ G06F 3/04842
705/5
2019/0146725 A1   5/2019 Kook et al.

FOREIGN PATENT DOCUMENTS

CN          104683453 A       6/2015
CN          105072180 A       11/2015
(Continued)

OTHER PUBLICATIONS

Fly Ping Digital, "Where is the safest place to put data in the era of big data Of course, it is the most secure in my cloud," Online article, Sep. 23, 2018, <https://baijiahao.baidu.com/s?id=1612401814566236910&wfr=spider&for=pc> last accessed on Dec. 20, 2022.

*Primary Examiner* — Isaac M Woo
(74) *Attorney, Agent, or Firm* — HOUTTEMAN LAW LLC

(57) ABSTRACT

The present disclosure provides an information sharing method and apparatus, an electronic device, and a non-transitory computer-readable storage medium, relating to the field of data processing. The information sharing method includes: acquiring information to be shared, and extracting a first parameter of the information to be shared; acquiring object groups to share with; grouping, based on a first preset rule, the information to be shared according to the first parameter to obtain information groups; matching, based on a second preset rule, the information groups with the object groups; and processing, in response to the operation of acquiring the object groups, the matched information groups respectively, and sharing the matched information groups to corresponding object groups.

19 Claims, 3 Drawing Sheets

(58) Field of Classification Search
USPC .................................................. 707/600–899
See application file for complete search history.

(56) References Cited

FOREIGN PATENT DOCUMENTS

| | | |
|---|---|---|
| CN | 106341481 A | 1/2017 |
| CN | 106375366 A | 2/2017 |
| CN | 208227195 U | 12/2018 |
| CN | 110177039 A | 8/2019 |
| CN | 110380954 A | 10/2019 |
| CN | 110489622 A | 11/2019 |

* cited by examiner

ELECTRONIC DEVICE, AND COMPUTER-READABLE STORAGE MEDIUM

TECHNICAL FIELD

The present disclosure relates to the field of data processing, and in particular relates to an information sharing method, an information sharing apparatus, an electronic device, and a computer-readable storage medium.

BACKGROUND

As functions of electronic devices become more and more abundant, more and more users share information, including pictures, texts, audios and videos, to others through electronic devices, and the users may select to upload contents to be shared to a cloud for other users to browse and comment.

Currently, when a user shares information, the content is typically directly shared to a cloud, and other users can directly acquire corresponding information. However, this does not consider different interpersonal relationships, and privacy of the shared content, resulting in poor sharing effect and user experience.

SUMMARY

Various aspects of the present disclosure provide an information sharing method, an information sharing apparatus, an electronic device, and a computer-readable storage medium, which can improve the sharing privacy as well as the user experience.

In an aspect of the present disclosure, there is provided an information sharing method, including:
  acquiring information to be shared, and extracting a first parameter of the information to be shared;
  acquiring object groups to share with;
  grouping, based on a first preset rule, the information to be shared according to the first parameter to obtain information groups;
  matching, based on a second preset rule, the information groups with the object groups; and
  processing, in response to the operation of acquiring the object groups, the matched information groups respectively, and sharing the matched information groups to corresponding object groups.

In some implementations, the first parameter includes:
a format of the information to be shared, including but not limited to picture, voice, video and text; or
an attribute of the information to be shared, which is extracted by analyzing content of the information to be shared and includes but not limited to content attribute, or a character attribute.

In some implementations, the acquiring the object groups to share with includes:
  acquiring label information of objects to share with, the label information including at least one of interpersonal relationship or features of the objects, and grouping the objects to share with according to the label information to obtain the object groups.

In some implementations, the grouping, based on the first preset rule, the information to be shared according to the first parameter to obtain the information groups includes:
  classifying, according to the format of the information to be shared, the information to be shared into at least one of a video information group, a text information group, a voice information group, or a picture information group;
  or classifying, according to the attribute of the information to be shared, the information to be shared into at least one of a family information group, a colleague information group, or a friend information group.

In some implementations, the matching, based on the second preset rule, the information groups with the object groups includes:
  extracting the first parameter and the label information, determining relevance between the first parameter and the label information, and matching the information groups with the object groups.

In some implementations, the processing, in response to the operation of acquiring the object groups, the matched information groups respectively includes:
  processing, when the first parameter is matched with the label information, the information groups according to the matching.

In some implementations, the information sharing method further includes: acquiring, by the object groups to share with, corresponding processed information groups, and presenting different effects, which includes:
  activating, by the object groups to share with, a floating frame through a touch display area, to display the matched information groups and present different effects.

In another aspect of the present disclosure, there is provided an information sharing apparatus, including:
  an information collector configured to acquire information to be shared by a user and object groups to share with, and extract a first parameter of the information to be shared;
  an information classifier configured to group, in response to a first preset rule, the information to be shared according to the first parameter to obtain information groups;
  an information processor configured to match, in response to a second preset rule, the information groups with the object groups, and process, in response to the operation of acquiring the object groups, the matched information groups respectively; and
  an information display configured to display, in response to a request of acquiring the object groups to share with, the respective processed information groups with different effects.

In some implementations, the information collector is further configured to:
  acquire a format of the information to be shared; or
  analyze content of the information to be shared to extract an attribute of the information to be shared, the attribute including at least one of a character attribute or an environmental attribute; or
  acquire label information of objects to share with, the label information including at least one of interpersonal relationship or features of the objects, and group the objects to share with according to the label information to obtain the object groups.

In some implementations, the information classifier is configured to:
  classify, according to the format of the information to be shared, the information to be shared into at least one of a video information group, a text information group, a voice information group, or a picture information group; or classify, according to the attribute of the information to be shared, the information to be shared into at least one of a family information group, a colleague information group, or a friend information group.

In some implementations, the information processor is further configured to:

extract the first parameter and the label information, determine relevance between the first parameter and the label information, and match the information groups with the object groups; and process, when the first parameter is matched with the label information, the information groups according to the matching.

In some implementations, the information display if further configured to:

activate, in response to a touch request in a touch display area by the object groups to share with, a floating frame to display the matched information groups and present different effects.

In another aspect of the present disclosure, there is provided an electronic device, including:

at least one processor; and a memory communicatively connected to the at least one processor; wherein the memory stores thereon instructions executable by the at least one processor so that when the instructions are executed by the at least one processor, the at least one processor performs the information sharing method as described above.

In another aspect of the present disclosure, there is provided provides a non-transitory computer-readable storage medium having stored thereon computer instructions, wherein the computer instructions are configured to cause the computer to perform the information sharing method as described above.

BRIEF DESCRIPTION OF DRAWINGS

In order to explain technical solutions in embodiments of the present disclosure more clearly, drawings required for description of the embodiments will now be illustrated briefly, obviously, the drawings described below are merely some embodiments of the present disclosure, and other drawings may be obtained by one of ordinary skill in the art based on these drawings without any creative labor.

DETAIL DESCRIPTION OF EMBODIMENTS

The technical solutions in the embodiments of the present disclosure will be described clearly and completely below with reference to the accompanying drawings in the embodiments of the present disclosure. Obviously, the described embodiments are merely some but not all embodiments of the present disclosure. All other embodiments obtained by the those of ordinary skill in the art based on the embodiments of the present disclosure without paying any creative effort shall be included in the protection scope of the present disclosure.

Figure 1:
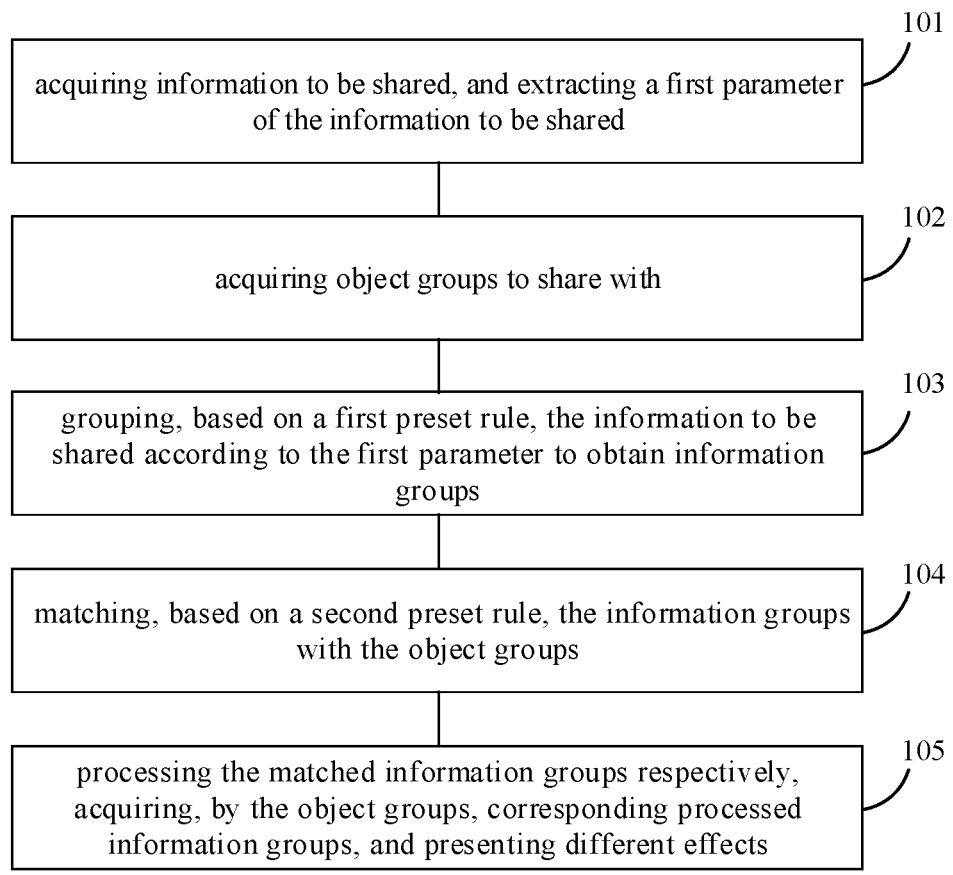
FIG. 1 shows an information sharing method according to an embodiment of the present disclosure.

FIG. 1 shows an information sharing method according to an embodiment of the present disclosure. The information sharing method may include the following steps 101 to 105.

At step 101, acquiring information to be shared, and extracting a first parameter of the information to be shared.

In an embodiment of the present disclosure, when a user wants to share some content, the information to be shared, including but not limited to, picture information, voice information, video information, and text information, is firstly acquired, and then a first parameter, including a format, of the information to be shared is extracted. For example, the information to be shared may belong to at least one of picture information, video information, voice information, or text information, or may be picture information including a combination of text information and voice information as well, which is not limited in the present disclosure.

Alternatively, an attribute, such as content, a character attribute, or the like, of the information to be shared may be extracted by analyzing content of the information to be shared by means of, for example, an image recognition technology, a semantic recognition technology, or the like. As an example, the information to be shared may be a photo, and the attribute includes content of the photo, such as characters, environmental information, or the like in the photo, as well as character attributes of the characters in the photo, their relationship with the sharer, or the like. The information to be shared may be voice information, and the attribute of the information includes voice content. The information to be shared may be video information, and the attribute of the information includes video content, such as characters in the video, as well as attributes of the characters and their relationship with the sharer.

At step 102, acquiring object groups to share with.

In the present disclosure, the acquiring the object groups to share with includes acquiring information of the object groups to share with, which is locally stored or stored in a cloud by a user, to obtain the object groups to share with; or obtaining information of the object groups by directly adding object information.

At step 103, grouping, based on a first preset rule, the information to be shared according to the first parameter to obtain information groups.

In the present disclosure, the first parameter includes a format of the information to be shared, such as picture, video, voice, text, or the like, or a picture including a combination of text and voice as well, which is not limited in the present disclosure.

Alternatively, an attribute of the information to be shared may be extracted by analyzing the content of the information to be shared by means of, for example, an image recognition technology, a semantic recognition technology, or the like.

As an example, according to the format of the information to be shared, the information to be shared may be directly classified into a picture information group, a video information group, a voice information group, or a text information group.

Alternatively, an attribute of the information to be shared, such as picture content, a character attribute in the picture, a relationship with the sharer, or the like, may be extracted by means of an image recognition technology, a semantic recognition technology, or the like. The attribute of voice information includes voice content. The attribute of video information includes characters in the video, or relationship between the characters and the sharer. The information to be shared is grouped according to the extracted attribute.

For example, the information to be shared is a family photo of the sharer, and information of the characters in the picture is extracted through an identification means such as image recognition or face recognition, and matched with character information stored in a server to obtain the corresponding character attribute, and then the information to be shared is classified into family photos according to the character attribute.

At step 104, matching, based on a second preset rule, the information groups with the object groups.

In the present disclosure, based on the second preset rule, the information groups and the object groups are matched according to the first parameter. For example, the information to be shared is picture information, and the picture content is a family photo of the sharer. The second preset rule includes: matching information groups to be shared with the object groups based on the relationship between the sharer and the object groups which may be obtained by, for example, acquiring a preset relationship list and then acquiring the relationship between the sharer and the object groups from the list, where, the object groups include family members and colleagues, the content to be shared is a family photo, a matching degree between the family members and information group is higher than that between the colleagues and information group.

At step 105, processing, in response to the operation of acquiring the object groups, the matched information groups respectively, and sharing the matched information groups to corresponding object groups.

In the present disclosure, according to correspondence relationship between the information groups and the object groups, and in response to the operation of acquiring the object groups, the matched information groups are processed respectively, and when the object groups acquire the processed information groups, different object groups may acquire different contents according to the matching relationship (correspondence relationship).

As an example, the information groups include picture information and voice information, where the picture information is matched with object group A, and the voice information is matched with object group B. According to the preset correspondence relationship, such as a stored relationship list, the picture information and the voice information are processed, respectively. The object groups A and B present different effects while acquiring the information groups. The object group A may acquire the processed picture information and unprocessed voice information, or the object group A may acquire the processed picture information and not acquire the voice information. The object group B may acquire the processed voice information and not acquire the picture information, or the object group B may acquire the processed voice information and unprocessed picture information. According to the matching relationship, different object groups may acquire different contents and present different effects.

Figure 2:
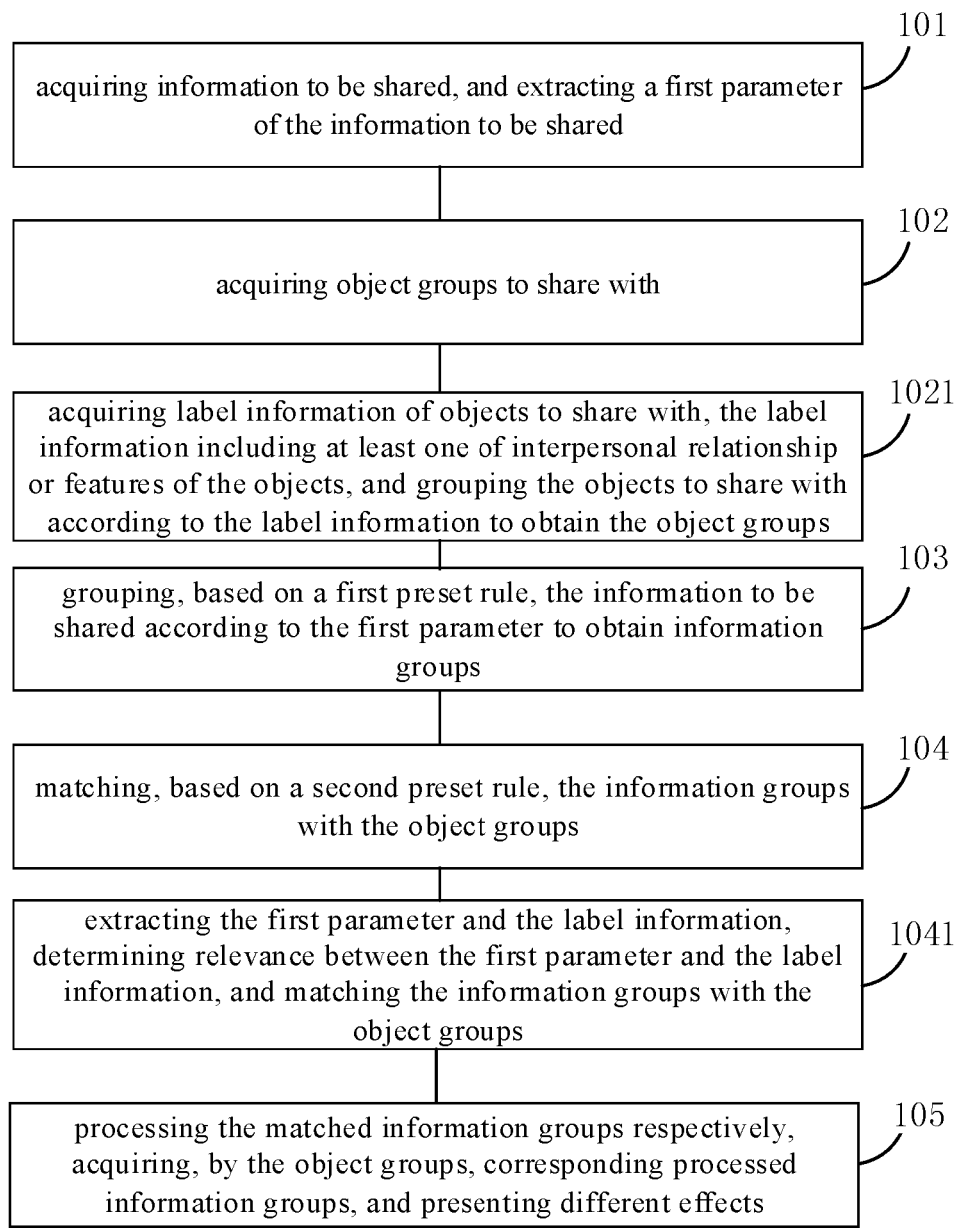
FIG. 2 shows an information sharing method according to another embodiment of the present disclosure.

FIG. 2 shows an information sharing method according to an embodiment of the present disclosure. The method further includes the following steps 1021 and 1041.

At step 1021, acquiring label information of objects to share with, the label information including at least one of interpersonal relationship or features of the objects, and grouping the objects to share with according to the label information to obtain the object groups.

In the present disclosure, the object groups to share with may be acquired from information stored locally or in a cloud, such as an object list including label information of the objects. For example, the label information includes a first target object group authorized to receive the shared information, and a second target object group not authorized to receive the shared information.

Alternatively, for example, the objects include an object M, an object N, and an object Z, where the object M is a family member, the object N is a classmate, and the object Z is a colleague. In the list information stored locally or in the cloud, the object M has a label information of family member, the object N has a label information of classmate, and the object Z has a label information of colleague It is acquired that the objects to share with are objects M and N, and according to the stored label information, the object groups are classified into a family group and a colleague group.

At step 1041, extracting the first parameter and the label information, determining relevance between the first parameter and the label information, and matching the information groups with the object groups.

In the present disclosure, the first parameter includes a format of the information to be shared, such as picture, video, voice, text, or the like, or picture information including a combination of text information and voice information as well, which is not limited in the present disclosure.

Alternatively, an attribute of the information to be shared may be extracted by analyzing the content of the information to be shared by means of, for example, an image recognition technology, a semantic recognition technology, or the like.

For example, the information groups to be shared include picture information and voice information, where the voice information has a higher privacy, and is to share with close people. Firstly, the label information of the objects to share with, such as family members, classmates, colleagues, or the like, is acquired. During information sharing, the information groups and the object groups are matched according to relevance between the first parameter and the label information, and the family members can obtain the picture information and the voice information.

For example, when a family photo of the sharer is to be shared, an attribute of the information to be shared, such as a character attribute, is extracted by analyzing the content of the information to be shared by means of an image recognition technology, a semantic recognition technology, or the like. It is determined, by analyzing, that the characters in the photo are the sharer and his/her family members, and the relationship with the sharer is family. Then, the label information of the object groups, such as family members, classmates, colleagues, or the like, is acquired. During information sharing, the information groups and the object groups are matched according to relevance between the attribute of the information to be shared and the label information, and thus, the family members can obtain the information to be shared.

In an embodiment of the present disclosure, acquiring the information to be shared, and extracting the first parameter of the information to be shared includes firstly acquiring the information to be shared, and extracting the first parameter of the information to be shared, including acquiring a format of the information to be shared, such as picture, video, voice, text, or the like. As an example, the information to be shared is a family photo of the sharer, and includes picture information and accompanying voice information, and the format of the information to be shared includes picture, video, voice, and text.

The acquiring the object groups to share with includes acquiring information of the object groups to share with, which is locally stored or stored in a cloud by the sharer, to obtain the object groups to share with; or obtaining information of the object groups by directly adding object information. As an example, the objects to share with include family members, friends, colleagues, and the like.

Directly classifying, according to the format of the information to be shared, the information to be shared into a picture information group and a voice information group may include classifying according to information stored locally or in a cloud, such as an object list including label information of the objects. For example, the label information includes a first target object group authorized to receive the shared information, and a second target object group not authorized to receive the shared information. For example, the first target object group is family members, and the second target object group is friends and colleagues. The shared picture information group and voice information group are matched with the object groups, and the matched information is processed, respectively. As a result, the family members can acquire the corresponding information, including image information and voice information, while the friends and the colleagues cannot acquire the shared content.

In another embodiment of the present disclosure, extracting the first parameter of the information to be shared includes firstly acquiring the information to be shared, and extracting the first parameter of the information to be shared, including acquiring a format of the information to be shared, such as picture, video, voice, text, or the like. As an example, the information to be shared is a family photo of the sharer, and includes picture information and accompanying text information and voice information. Alternatively, an attribute of the information to be shared may be extracted by analyzing the content of the information to be shared by means of, for example, an image recognition technology, a semantic recognition technology, or the like. As an example, the image recognition technology is used to analyze the picture information and obtain an attribute of the picture content, including an attribute of a character in the picture, such as recognize a feature of a character in the picture information, and compare the attribute with the stored person information to screen out the corresponding character from the database, and obtain the stored character relationship. For voice information, voice recognition is performed to extract an attribute of voice, including voice content. The attribute of video information includes characters in the video, relationship between the characters and the sharer, or the like.

The acquiring the object groups to share with includes: acquiring label information of objects to share with, the label information including at least one of interpersonal relationship or features of the objects, and grouping the objects to share with according to the label information to obtain the object groups. For example, the object group includes family members, information of family members stored locally or in a cloud, as well as label information, including age information, corresponding to each family member, are acquired. According to predetermined age groups, the family members may be classified into a children group, a young group and an elderly group. As an example, family members under 5 years old are classified into the children group, and family members more than 50 years old are classified into the elderly group.

Based on a first preset rule, the information to be shared are grouped according to the first parameter to obtain information groups. As an example, the information groups to be shared are classified into family photos, voice information to family members, text information to family members, and the like.

Based on a second preset rule, the information groups are matched with the object groups, including matching, based on the second preset rule, the information groups with the object groups according to the first parameter. As an example, the object group is family members, label information, including age information, corresponding to each family member is acquired, and the information groups and the object groups are matched according to the age.

Processing, in response to the operation of acquiring the object groups, the matched information groups respectively, and sharing the matched information groups to corresponding object groups, includes the following two processings. In a case where the object group is children, since children are weak in literacy, for example, text information is subjected to character recognition, and then converted into voice information for sharing. In a case where the object group is the elderly, due to poor eyesight, it is often hard for the elderly to acquire text information, so the text information is locally amplified, or the text information is also subjected to character recognition and converted into voice information. For different object groups, different effects are presented when the information groups are acquired.

In another embodiment of the present disclosure, extracting the first parameter of the information to be shared includes firstly acquiring the information to be shared, and extracting the first parameter of the information to be shared, including acquiring a format of the information to be shared, such as picture, video, voice, text, or the like. As an example, the information to be shared is a family photo of the sharer, and includes picture information and accompanying text information and voice information. Alternatively, an attribute of the information to be shared may be extracted by analyzing the content of the information to be shared by means of, for example, an image recognition technology, a semantic recognition technology, or the like. As an example, the image recognition technology is used to analyze the picture information and obtain an attribute of the picture content, including an attribute of a character in the picture, such as recognize a feature of a character in the picture information, and compare the attribute with the stored person information to screen out the corresponding character from the database, and obtain the stored character relationship. For voice information, voice recognition is performed to extract a voice attribute, including voice content. The attribute of video information includes characters in the video, relationship between the characters and the sharer, or the like.

The acquiring the object groups to share with includes acquiring label information of objects to share with, the label information including at least one of interpersonal relationship or features of the objects, and grouping the objects to share with according to the label information to obtain the object groups. For example, the object groups include family members and colleagues, the label information of the objects to share with, which are locally stored or stored in a cloud, is acquired, and by distinguishing the relationship between the objects to share with and the sharer, the objects to share with may be classified into a family group, a friend group and a colleague group. As an example, label information of objects to share with is acquired, according to which the objects are classified into a family group and a colleague group.

Based on a first preset rule, the information to be shared are grouped according to the first parameter to obtain information groups. As an example, the information groups to be shared are classified into family photos, voice information to family members, text information to family members, and the like.

Based on a second preset rule, the information groups are matched with the object groups, including matching, based on the second preset rule, the information groups with the object groups according to the first parameter. As an example, the objects are classified into a family group and a colleague group according to the label information, the information groups to be shared this time include family photos, voice information to family members, text information and video information to family members, and the like. Considering interpersonal relationship, and out of the purposes of protecting privacy of family members or not sharing some part of the information, such as at least one of some voice information, text information, or video information, with colleagues, the information groups are matched with the object groups.

In response to the operation of acquiring the object groups, the matched information groups are processed, respectively, and the matched information groups are shared to corresponding object groups.

For example, when the object group is a colleague group, in response to the operation of acquiring the object groups, the photo is partially blurred so that a colleague can see the sharer in the photo, but cannot see others clearly; and when the object group is a family group, the photo is not blurred. As another example, the information group is text information, and the text information is firstly subjected to semantical recognition, and the content desired to be acquired by the family group only, such as greeting for parents or thoughts of mind, may be set with keywords or contents in a preset rule. When the colleague group acquires the shared text information, the contents for the family only will be automatically removed, but when the family group acquires the same shared text information, the text information is not processed. As another example, the information group is video information related to family, and the object groups include a family group and a colleague group. Then, image frames in the video may be processed according to a preset processing rule, and an appropriate image frame is selected as the display content, including screening out an image frame including only the sharer as the display content, or screening out an image frame in which other family members are blurred and taking the processed image as the display content. That is, what the colleague group acquires is a processed image frame instead of the video content, while on the other hand, the video content is displayed normally without any processing when acquired by the family group.

In another embodiment of the present disclosure, extracting the first parameter of the information to be shared includes firstly acquiring the information to be shared, and extracting the first parameter of the information to be shared, including a format of the information to be shared, such as picture, video, voice, text, or the like. As an example, the information to be shared is a department photo of the sharer with colleagues, and an attribute of the information to be shared is extracted by means of an image recognition technology, a semantic recognition technology, or the like. As an example, the image recognition technology is used to analyze the picture information and obtain an attribute of the picture content, including an attribute of a character in the picture, such as recognize a feature of a character in the picture information, and compare the attribute with the stored person information to screen out the corresponding character from the database, and obtain the stored character relationship.

The acquiring the object groups to share with includes acquiring label information of objects to share with, the label information including at least one of interpersonal relationship or features of the objects, and grouping the objects to share with according to the label information to obtain the object groups. For example, the object groups include family members and colleagues, the label information of the objects to share with, which are locally stored or stored in a cloud, is acquired, and by distinguishing the relationship between the objects to share with and the sharer, the objects to share with may be classified into a family group, a friend group and a colleague group. As an example, label information of objects to share with is acquired, according to which the objects are classified into a family group and a colleague group.

Based on a first preset rule, the information to be shared are grouped according to the first parameter to obtain information groups. As an example, the information group to be shared is classified into department photos.

Based on a second preset rule, the information groups are matched with the object groups, including matching, based on the second preset rule, the information groups with the object groups according to the first parameter. As an example, the objects are classified into a family group and a colleague group according to the label information, and the information group to be shared this time includes a photo with colleagues.

In response to the operation of acquiring the object groups, the matched information groups are processed, respectively, and the matched information groups are shared to corresponding object groups. As an example, when the colleague group acquires the shared department photo, information of department members is obtained from department information stored locally or in a cloud, a face recognition technology is used to recognize information of people in the photo and compare the information with the stored information of department members to acquire information of a missing member. Based on the acquired information of the members, the department photo is processed, including selecting, after determining the missing member in the photo, photos of the missing member from the past shared photos or a database to extract information, matting a picture of the missing member, and selecting a proper position in the department photo for filling or covering. For example, the photo is a photo of standing department members in which colleague M is missing. Then, photos related to M are recognized from the database to screen out an image in which colleague M is standing for processing, and the picture content of M standing is extracted and filled into the department photo.

Another embodiment of the present disclosure includes: acquiring information to be shared, and extracting a first parameter of the information to be shared; acquiring object groups to share with; grouping, based on a first preset rule, the information to be shared according to the first parameter to obtain information groups; matching, based on a second preset rule, the information groups with the object groups; and processing, in response to the operation of acquiring the object groups, the matched information groups respectively; and operating, in response to the operation of acquiring the object groups, on a first area of the shared information to trigger different actions. For example, the information to be shared includes a family photo, text information, voice information, video information, and the like, and after the object group acquires the shared content, for example, when a member in the family photo is touched, a floating frame may be popped up to display an action hidden in the photo. As another example, when a certain area of the text information is touched, voice can be automatically played.

Another embodiment of the present disclosure includes: acquiring information to be shared, and extracting a first parameter of the information to be shared; acquiring object groups to share with; grouping, based on a first preset rule, the information to be shared according to the first parameter to obtain information groups; matching, based on a second preset rule, the information groups with the object groups; and processing, in response to the operation of acquiring the object groups, the matched information groups respectively; and before responding to the operation of acquiring the object groups, the method further includes keeping the information to be shared in a first initial state. As an example, the information groups include picture information, voice information, and text information, and the object groups include family members and colleagues. Before responding to an acquisition operation of the family members or colleagues, the information groups are in a default static state, or information which can be acquired by both the family members and the colleagues, such as picture information, is directly displayed, and when the operation of acquiring the object groups is received, the information groups are respectively processed to present different effects.

Figure 3:
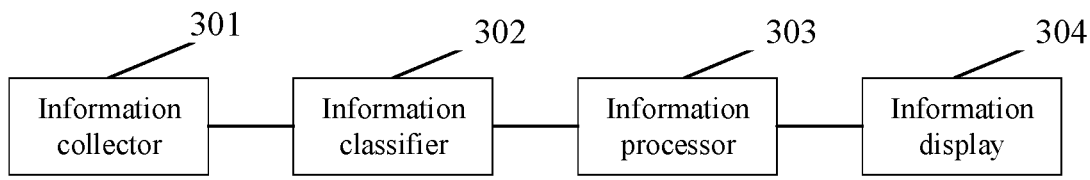
FIG. 3 shows an information sharing apparatus according to an embodiment of the present disclosure.

FIG. 3 shows an information sharing apparatus according to an embodiment of the present disclosure. The information sharing apparatus includes:

an information collector 301 configured to acquire information to be shared by a user and object groups to share with, and extract a first parameter of the information to be shared; an information classifier 302 configured to group, in response to a first preset rule, the information to be shared according to the first parameter to obtain information groups; an information processor 303 configured to match, in response to a second preset rule, the information groups with the object groups, and process, in response to the operation of acquiring the object groups, the matched information groups respectively; and an information display 304 configured to display, in response to a request of acquiring the object groups to share with, the respective processed information groups with different effects.

The information collector 301 further configured to acquire the information to be shared by the user and object groups to share with, and extract the first parameter of the information to be shared includes: the information collector acquires a format of the information to be shared; or the information collector extracts an attribute of the information to be shared by analyzing content of the information to be shared, the attribute including at least one of a character attribute or an environmental attribute.

The information collector 301 is further configured to acquire label information of the objects to share with, the label information including at least one of interpersonal relationship or features of the objects, and group the objects to share with according to the label information to obtain the object groups. The information classifier is configured to classify, according to the format of the information to be shared, the information to be shared into at least one of a video information group, a text information group, a voice information group, or a picture information group; or the information classifier 302 is configured to classify, according to the attribute of the information to be shared, the information to be shared into at least one of a family information group, a colleague information group, or a friend information group. The information processor 303 is configured to extract the first parameter and the label information, determine relevance between the first parameter and the label information, and match the information groups with the object groups; and process, when the first parameter is matched with the label information, the information groups according to the matching. The information display 304 is configured to activate, in response to a touch request in a touch display area by the object groups to share with, a floating frame to display the matched information groups and present different effects.

Figure 4:
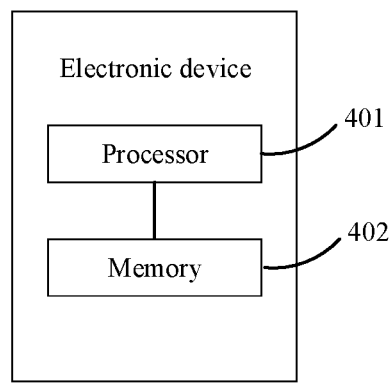
FIG. 4 shows an electronic device according to an embodiment of the present disclosure.

FIG. 4 shows an electronic device according to an embodiment of the present disclosure. The electronic device includes: at least one processor 401; and a memory 402 communicatively connected to the at least one processor. The memory stores thereon instructions executable by the at least one processor so that when the instructions are executed by the at least one processor, the at least one processor performs the information sharing method as described above.

Figure 5:
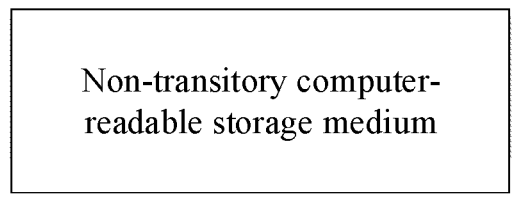
FIG. 5 shows a non-transitory computer-readable storage medium according to an embodiment of the present disclosure.

FIG. 5 shows a non-transitory computer-readable storage medium storing computer instructions thereon according to an embodiment of the present disclosure. The computer instructions are configured to cause the computer to perform the information sharing method as described above.

It will be appreciated that as used herein, terms "first" and "second" are used for the purpose of illustration only and are not to be construed as indicating or implying a relative importance or implicitly indicating the number of the indicated technical features. Therefore, features defined by "first" or "second" may include at least one of the features either explicitly or implicitly. In the description of the present disclosure, "plurality" means at least two, e.g., two, three, etc., unless explicitly defined otherwise.

In the description of the present disclosure, any reference to "an embodiment", "some embodiments", "example", "specific example", or "some implementations", or the like means that the specific features, structures, materials, or characteristics described in connection with the embodiment, example or implementation are included in at least one embodiment, example or implementation of the present disclosure. In this description, the schematic representation of the above terms does not necessarily mean the same embodiment, example or implementation. Further, the described specific features, structures, materials or characteristics may be combined in any suitable manner in any one or more embodiments, examples or implementations. Moreover, various embodiments, examples or implementations and features of various embodiments, examples or implementations described in this description can be combined by one skilled in the art without contradiction.

Any process or method description in flowcharts or otherwise described herein may be understood as including one or more modules, segments, or portions for implementing codes of executable instructions for specific logical functions or steps in the process, and alternate implementations are included in the scope of the preferred implementations of the present disclosure in which functions may be implemented in a substantially simultaneous manner or in a reverse order according to the functions involved, not in the order shown or discussed, as would be understood by those skilled in the art to which the embodiments of the present disclosure belong.

The logic and/or steps represented in the flowcharts or otherwise described herein, such as an ordered listing of executable instructions that can be considered to implement logical functions, can be embodied in any computer-readable medium for use by or in connection with an instruction execution system, apparatus, or device, such as a computer-based system, a processor-containing system, or any other system that can fetch the instructions from the instruction execution system, apparatus, or device and execute the instructions. In terms of this description, a "computer-readable medium" may be any means that can contain, store, communicate, propagate, or transport a program for use by or in connection with the instruction execution system, apparatus, or device. More specific examples (a non-exhaustive list) of the computer-readable medium may include the following: an electrical connection part (an electronic device) having one or more wires, a portable computer diskette (magnetic device), a random access memory (RAM), a read-only memory (ROM), an erasable programmable read-only memory (EPROM or Flash memory), an optical fiber device, and a portable compact disc read-only memory (CDROM). Further, the computer-readable medium can even be paper or another suitable medium upon which the program is printed, so that the program can be electronically captured, via for instance optical scanning of the paper or another medium, then compiled, interpreted or otherwise processed in a suitable manner if necessary, and then stored in a computer memory.

It will be appreciated that portions of the present disclosure can be implemented in hardware, software, firmware, or a combination thereof. In the above implementations, various steps or methods may be implemented in software or firmware stored in a memory and executed by a suitable instruction execution system. For example, if implemented in hardware, as in another implementation, any one or combination of the following technologies, which are well known in the art, may be used: a discrete logic circuit having a logic gate circuit for implementing a logic function on a data signal, an application specific integrated circuit having an appropriate combinational logic gate circuit, a programmable gate array (PGA), a field programmable gate array (FPGA), or the like.

Those of ordinary skill in the art will appreciate that all or part of the steps carried in the methods for implementing the above embodiments may be completed by a program, stored in a computer-readable storage medium, instructing related hardware, and the program, when executed, includes one or a combination of the steps of the embodiments of the methods.

In addition, functional units in various embodiments of the present disclosure may be integrated into one processing module, or each unit may be provided separately and physically, or two or more units may be integrated into one module. The integrated module as described above may be implemented in the form of hardware, or in the form of a software functional module. The integrated module, if implemented in the form of a software functional module and sold or used as a stand-alone product, may be stored in a computer-readable storage medium.

The above storage medium may be a read only memory, a magnetic disk or an optical disk or the like. While embodiments of the present disclosure have been shown and described above, it will be appreciated that the above embodiments are exemplary and should not to be construed as limiting the present disclosure, and that changes, modifications, substitutions and variations may be made to the above embodiments by those of ordinary skill in the art within the scope of the present disclosure.

What is claimed is:

1. An information sharing method, comprising:
   acquiring information to be shared, and extracting a first parameter of the information to be shared;
   acquiring object groups to share with;
   grouping, based on a first preset rule, the information to be shared according to the first parameter to obtain information groups;
   matching, based on a second preset rule, the information groups with the object groups; and
   processing, in response to the operation of acquiring the object groups, the matched information groups respectively, and sharing the matched information groups to corresponding object groups, wherein
   the first parameter comprises: an attribute of the information to be shared, which is extracted by analyzing content of the information to be shared and comprises a content attribute or a character attribute, and wherein
   a format of the information to be shared comprises picture, voice, video and text.

2. The information sharing method according to claim 1, wherein the acquiring the object groups to share with comprises:
   acquiring label information of objects to share with, the label information comprising at least one of interpersonal relationship or features of the objects, and grouping the objects to share with according to the label information to obtain the object groups.

3. The information sharing method according to claim 2, wherein the grouping, based on the first preset rule, the information to be shared according to the first parameter to obtain the information groups comprises:
   classifying, according to the format of the information to be shared, the information to be shared into at least one of a video information group, a text information group, a voice information group, or a picture information group;
   or classifying, according to the attribute of the information to be shared, the information to be shared into at least one of a family information group, a colleague information group, or a friend information group.

4. The information sharing method according to claim 2, wherein the matching, based on the second preset rule, the information groups with the object groups comprises:
   extracting the first parameter and the label information, determining relevance between the first parameter and the label information, and matching the information groups with the object groups.

5. The information sharing method according to claim 4, wherein the processing, in response to the operation of acquiring the object groups, the matched information groups respectively comprises:
   processing, when the first parameter is matched with the label information, the information groups according to the matching.

6. The information sharing method according to claim 5, further comprising: acquiring, by the object groups to share with, corresponding processed information groups, and presenting different effects, which comprises:
   activating, by the object groups to share with, a floating frame through a touch display area, to display the matched information groups and present different effects.

7. The information sharing method according to claim 1, wherein the grouping, based on the first preset rule, the information to be shared according to the first parameter to obtain the information groups comprises:

classifying, according to the format of the information to be shared, the information to be shared into at least one of a video information group, a text information group, a voice information group, or a picture information group;

or classifying, according to the attribute of the information to be shared, the information to be shared into at least one of a family information group, a colleague information group, or a friend information group.

8. The information sharing method according to claim 1, wherein the matching, based on the second preset rule, the information groups with the object groups comprises:

extracting the first parameter and the label information, determining relevance between the first parameter and the label information, and matching the information groups with the object groups.

9. The information sharing method according to claim 8, wherein the processing, in response to the operation of acquiring the object groups, the matched information groups respectively comprises:

processing, when the first parameter is matched with the label information, the information groups according to the matching.

10. The information sharing method according to claim 9, further comprising: acquiring, by the object groups to share with, corresponding processed information groups, and presenting different effects, which comprises:

activating, by the object groups to share with, a floating frame through a touch display area, to display the matched information groups and present different effects.

11. An electronic device, comprising:

at least one processor; and a memory communicatively connected to the at least one processor; wherein the memory stores thereon instructions executable by the at least one processor so that when the instructions are executed by the at least one processor, the at least one processor performs an information sharing method, comprising:

acquiring information to be shared, and extracting a first parameter of the information to be shared;

acquiring object groups to share with;

grouping, based on a first preset rule, the information to be shared according to the first parameter to obtain information groups;

matching, based on a second preset rule, the information groups with the object groups; and processing, in response to the operation of acquiring the object groups, the matched information groups respectively, and sharing the matched information groups to corresponding object groups, wherein the first parameter comprises: an attribute of the information to be shared, which is extracted by analyzing content of the information to be shared and comprises a content attribute or a character attribute, and wherein a format of the information to be shared comprises picture, voice, video and text.

12. The electronic device according to claim 11, wherein the first parameter comprises:

a format of the information to be shared, comprising picture, voice, video and text; or an attribute of the information to be shared, which is extracted by analyzing content of the information to be shared and comprises a content attribute or a character attribute.

13. The electronic device according to claim 12, wherein the acquiring the object groups to share with comprises:

acquiring label information of objects to share with, the label information comprising at least one of interpersonal relationship or features of the objects, and grouping the objects to share with according to the label information to obtain the object groups.

14. The information sharing method according to claim 12, wherein the grouping, based on the first preset rule, the information to be shared according to the first parameter to obtain the information groups comprises:

classifying, according to the format of the information to be shared, the information to be shared into at least one of a video information group, a text information group, a voice information group, or a picture information group;

or classifying, according to the attribute of the information to be shared, the information to be shared into at least one of a family information group, a colleague information group, or a friend information group.

15. The information sharing method according to claim 12, wherein the matching, based on the second preset rule, the information groups with the object groups comprises:

extracting the first parameter and the label information, determining relevance between the first parameter and the label information, and matching the information groups with the object groups.

16. A non-transitory computer-readable storage medium having computer instructions stored thereon, wherein the computer instructions are configured to cause the computer to perform an information sharing method, comprising:

acquiring information to be shared, and extracting a first parameter of the information to be shared;

acquiring object groups to share with;

grouping, based on a first preset rule, the information to be shared according to the first parameter to obtain information groups;

matching, based on a second preset rule, the information groups with the object groups; and processing, in response to the operation of acquiring the object groups, the matched information groups respectively, and sharing the matched information groups to corresponding object groups, wherein the first parameter comprises: an attribute of the information to be shared, which is extracted by analyzing content of the information to be shared and comprises a content attribute or a character attribute, and wherein a format of the information to be shared comprises picture, voice, video and text.

17. The non-transitory computer-readable storage medium according to claim 16, wherein the first parameter comprises:

a format of the information to be shared, comprising picture, voice, video and text; or an attribute of the information to be shared, which is extracted by analyzing content of the information to be shared and comprises a content attribute or a character attribute.

18. The non-transitory computer-readable storage medium according to claim 17, wherein the acquiring the object groups to share with comprises:

acquiring label information of objects to share with, the label information comprising at least one of interpersonal relationship or features of the objects, and grouping the objects to share with according to the label information to obtain the object groups.

19. The non-transitory computer-readable storage medium according to claim 18, wherein the grouping, based on the first preset rule, the information to be shared according to the first parameter to obtain the information groups comprises:

classifying, according to the format of the information to be shared, the information to be shared into at least one of a video information group, a text information group, a voice information group, or a picture information group; or classifying, according to the attribute of the information to be shared, the information to be shared into at least one of a family information group, a colleague information group, or a friend information group.

\* \* \* \* \*